US009562194B2

(12) United States Patent
Kellens et al.

(10) Patent No.: US 9,562,194 B2
(45) Date of Patent: Feb. 7, 2017

(54) TORREFACTION REACTOR

(71) Applicant: SOLEX THERMAL SCIENCE INC., Calgary (CA)

(72) Inventors: Marc Jules Adelin Ghislain Kellens, Muizen (BE); Farah Skold, Calgary (CA); Ashley Dean Byman, De Winton (CA); Bernhard George Van Bommel, Hoogerheide (NL)

(73) Assignee: Solex Thermal Science Inc., Calgary (CA)

( * ) Notice: Subject to any disclaimer, the term of this patent is extended or adjusted under 35 U.S.C. 154(b) by 369 days.

(21) Appl. No.: 14/178,097

(22) Filed: Feb. 11, 2014

(65) Prior Publication Data

US 2015/0225649 A1    Aug. 13, 2015

(51) Int. Cl.
*C10B 1/04*    (2006.01)
*C10B 23/00*    (2006.01)
(Continued)

(52) U.S. Cl.
CPC ............... *C10B 23/00* (2013.01); *C10B 1/04* (2013.01); *C10B 47/26* (2013.01); *C10B 53/02* (2013.01);
(Continued)

(58) Field of Classification Search
CPC ............ C10B 1/04; C10B 49/04; C10B 53/02; C10B 47/26; C10L 5/44; C10L 5/442; C10L 5/445; C10L 9/083
See application file for complete search history.

(56) References Cited

U.S. PATENT DOCUMENTS 3,397,460 A * 8/1968 Hall .................... B01J 6/001
                                                          165/166
4,115,202 A * 9/1978 Lorenz .................... C10B 1/04
                                                          201/15
(Continued)

FOREIGN PATENT DOCUMENTS

WO    WO 2013/190053 A1    12/2013

OTHER PUBLICATIONS

Extended European Search Report dated Jun. 12, 2015, issued in respect of corresponding European Application No. 15154360.0.
(Continued)

*Primary Examiner* — In Suk Bullock
*Assistant Examiner* — Jonathan Miller
(74) *Attorney, Agent, or Firm* — Geoffrey deKleine

(57) ABSTRACT

A torrefaction reactor includes a preheater section and a torrefaction section arranged to receive the biomass material from the preheater section. The preheater section includes a plurality of preheater plates arranged to facilitate the flow of the biomass material between the preheater plates by the force of gravity, each of the preheater plates facilitates a flow of a preheater fluid through the preheater plate for heating the biomass material. The torrefaction section includes a plurality of torrefaction plates arranged to facilitate the flow of the biomass material between the torrefaction plates by the force of gravity, each the torrefaction plates facilitates a flow of a torrefaction fluid through the torrefaction plate for heating the biomass material to the torrefaction temperature, and a first and second torrefaction purge gas openings to facilitate a flow of a torrefaction purge gas for providing an oxygen-depleted environment within the torrefaction section.

36 Claims, 5 Drawing Sheets

(51) Int. Cl.
*C10L 5/44* (2006.01)
*C10B 53/02* (2006.01)
*C10B 47/26* (2006.01)
*C10L 9/08* (2006.01)
*F26B 17/16* (2006.01)

(52) U.S. Cl.
CPC .................. *C10L 5/44* (2013.01); *C10L 9/083* (2013.01); *F26B 17/16* (2013.01); *F26B 2200/02* (2013.01); *Y02E 50/14* (2013.01); *Y02E 50/15* (2013.01)

(56) References Cited

U.S. PATENT DOCUMENTS

| | | | | |
|---|---|---|---|---|
| 4,134,794 A * | 1/1979 | Lorenz | ................... | C10B 53/08 201/27 |
| 6,249,989 B1 * | 6/2001 | Conochie | ............... | B01J 8/0285 34/181 |
| 8,043,478 B2 * | 10/2011 | Merrell | ................... | B01J 6/004 196/125 |
| 8,161,663 B2 * | 4/2012 | Weisselberg | ............ | C10L 9/083 202/109 |
| 8,198,493 B1 | 6/2012 | Livingston et al. | | |
| 8,266,812 B2 * | 9/2012 | Weisselberg | ............ | C10L 9/083 110/218 |
| 8,266,821 B2 * | 9/2012 | Weisselberg | ............ | C10L 9/083 110/219 |
| 8,276,289 B2 * | 10/2012 | Causer | ................... | C10B 49/02 122/22 |
| 8,322,056 B2 * | 12/2012 | Causer | ................... | C10B 49/02 122/22 |
| 8,549,769 B2 * | 10/2013 | Weisselberg | ............ | C10L 9/083 110/218 |
| 9,062,255 B2 * | 6/2015 | DePouli | ................... | C10B 7/02 |
| 2002/0009400 A1 * | 1/2002 | Conochie | ............... | B01J 8/0005 422/198 |
| 2007/0256316 A1 * | 11/2007 | Jordison | ................ | F26B 17/16 34/65 |
| 2011/0265373 A1 | 11/2011 | Thorn et al. | | |
| 2013/0075244 A1 * | 3/2013 | Eyer | ........................ | C10L 5/44 201/29 |
| 2013/0292093 A1 | 11/2013 | Huang et al. | | |
| 2014/0298716 A1 * | 10/2014 | Marty | ..................... | B01J 8/125 44/629 |

OTHER PUBLICATIONS

Koppejan, Jaap et al., Status overview of torrefaction technologies, Dec. 2012, pp. 1-61, IEA Bioenergy Task 32, http://www.ieabcc.nl/publicationsiIEA_Bioenergy_T32_Torrefaction_review.pdf.

\* cited by examiner

TORREFACTION REACTOR

TECHNICAL FIELD

The present disclosure relates to an apparatus for conversion of perishable biomass material into a stable fuel product.

BACKGROUND

The torrefaction process includes heating a biomass material to a temperature typically in the range of 200° C. to 320° C. for a period of time in an oxygen-deprived environment. During the torrefaction process, moisture and volatiles are removed from the biomass material, increasing the energy density of the material. Through the torrefaction process, the biomass material becomes hydrophobic and increases in resistance to microbial growth and decomposition. The torrefaction process is typically used to increase the shelf life of the biomass material and facilitate transportation of the material.

The torrified biomass material can be used for fuel, replacing coal, or for co-firing with coal, for example. The torrified biomass material can also be used as feeder stock for the production of biofuels such as syngas or bio-oils.

Present torrefaction processes include directly heated moving bed reactors, directly heated drum reactors, and fluidized bed reactors. Present processes may require tumbling, fluidization, or scraping of the biomass material within a reactor which may lead to degradation of the biomass material, or produce combustible dust that may pose a safety hazard.

Further, in present torrefaction processes, the biomass material is typically dried to remove excess moisture prior to entering a torrefaction reactor, and the heated torrified biomass that exits the torrefaction reactor typically requires cooling prior to further processing.

Improvements to torrefaction reactors are desired.

SUMMARY

One aspect of the invention provides a torrefaction reactor for a particulate biomass material that includes a preheater section including a preheater housing, and a preheater bank including a plurality of preheater plates arranged within the preheater housing in a spaced relationship to facilitate the flow of the biomass material between the preheater plates by the force of gravity, each of the plurality of preheater plates including an inlet and an outlet to facilitate a flow of a preheater fluid through the preheater plates for heating the biomass material to a temperature less than a torrefaction temperature, and a torrefaction section arranged to receive the biomass material from the preheater section that includes a torrefaction housing, a torrefaction bank including a plurality of torrefaction plates arranged within the torrefaction housing in a spaced relationship to, after the biomass material is heated in the preheater housing, facilitate the flow of the biomass material between the torrefaction plates by the force of gravity, each of the plurality of torrefaction plates including an inlet and an outlet to facilitate a flow of a torrefaction fluid through the torrefaction plates for heating the biomass material to the torrefaction temperature, and a first torrefaction purge gas opening on a first side of the torrefaction housing and a second torrefaction purge gas opening on a second side of the torrefaction housing to facilitate a flow of a torrefaction purge gas across the torrefaction housing, the torrefaction purge gas for providing an oxygen-depleted environment within the torrefaction section.

Another aspect of the invention provides that the preheater section and the torrefaction section are in a stacked arrangement to facilitate the flow of the biomass material from the preheater section to the torrefaction section by the force of gravity.

Another aspect of the invention provides that the torrefaction reactor includes a first valve that couples an outlet of the preheater section to an inlet of the torrefaction section and a second valve that couples to an outlet of the torrefaction section, wherein the first valve and the second valve facilitate a flow of the biomass material through the torrefaction section and facilitate substantially sealing the torrefaction section from the preheater section and the external environment.

Another aspect of the invention provides that each of the torrefaction plates includes a plurality of torrefaction plate openings, each torrefaction plate opening having a sealed periphery.

Another aspect of the invention provides that the first and second sides of the torrefaction housing are oriented generally parallel to the torrefaction plates to facilitate the flow of the torrefaction purge gas through the torrefaction plate openings.

Another aspect of the invention provides that the second side of the torrefaction housing having the second torrefaction purge gas opening is opposite the first side of the torrefaction housing having the first torrefaction purge gas opening.

Another aspect of the invention provides that torrefaction section includes a third torrefaction purge gas opening, located on a third side of the torrefaction housing adjacent to the first and second walls, wherein the third torrefaction purge gas opening is a torrefaction purge gas outlet and the first and second torrefaction purge gas openings are inlets.

Another aspect of the invention provides that the two innermost torrefaction plates of the torrefaction bank are spaced further apart than the spacing between other adjacent torrefaction plates of the torrefaction bank, providing a gap in the center portion of the torrefaction bank, and wherein the torrefaction bank includes a cover covering the gap to divert the biomass material flowing through the torrefaction section away from the gap.

Another aspect of the invention provides that the preheater housing includes a first dryer purge gas opening on a first side of the preheater housing and a second dryer purge gas opening on a second side of the preheater housing to facilitate a flow of a dryer purge gas across the preheater housing, the dryer purge gas for removing moisture from the preheater section when the preheater section is utilized for drying the biomass material.

Another aspect of the invention provides that each of the preheater plates includes a plurality of preheater plate openings, each preheater plate opening having a sealed periphery.

Another aspect of the invention provides that the first and the second sides of the preheater housing are oriented generally parallel to the preheater plates to facilitate the flow of the dryer purge gas through the dryer plate openings.

Another aspect of the invention provides that the second side of the preheater housing having the second dryer purge gas opening is opposite the first side of the preheater housing having the first dryer purge gas opening.

Another aspect of the invention provides that the two innermost preheater plates of the preheater bank are spaced further apart than the spacing between other adjacent preheater plates of the preheater bank, providing a gap in the center portion of the preheater bank, and wherein the preheater bank includes a cover covering the gap to divert the biomass material flowing through the preheater section away from the gap, and wherein preheater section includes a third dryer purge gas opening on a third side of the preheater housing adjacent to the first side and the second side of the preheater housing, wherein the third dryer purge gas opening is a dryer purge gas outlet and the first and second dryer purge gas openings are inlets.

Another aspect of the invention provides that the torrefaction reactor includes a cooling section arranged to receive the biomass material from the torrefaction section that includes a cooling housing, and a cooling bank comprising a plurality of cooling plates arranged within the cooling housing in a spaced relationship to, after the biomass material is heated in the torrefaction section, facilitate flow of the material between the cooling plates by the force of gravity, each of the plurality of cooling plates including an inlet and an outlet to facilitate a flow of a cooling fluid through the cooling plates for cooling the biomass material to less than about 200° C.

Another aspect of the invention provides that the cooling housing includes a first cooling purge gas opening on a first side of the cooling housing and a second cooling purge gas opening on a second side of the cooling housing to facilitate a flow of a cooling purge gas through the cooling section, the cooling purge gas for cooling the biomass material in the cooling section.

Another aspect of the invention provides that the cooling purge gas that has been heated by the biomass material in the cooling section is delivered to the torrefaction section as a heated torrefaction purge gas for heating the biomass material in the torrefaction section.

Another aspect of the invention provides that the torrefaction reactor includes a first valve that couples an outlet of the preheater section to an inlet of the torrefaction section and a second valve that couples an outlet of the torrefaction section and an inlet of the cooling section, wherein the first valve and the second valve substantially seal the torrefaction housing from the preheater section and the cooling section while facilitating a flow of the biomass material through the torrefaction section.

DRAWINGS

Embodiments of the present invention will be described, by way of example, with reference to the drawings and to the following description, in which.

DETAILED DESCRIPTION

Figure 1:
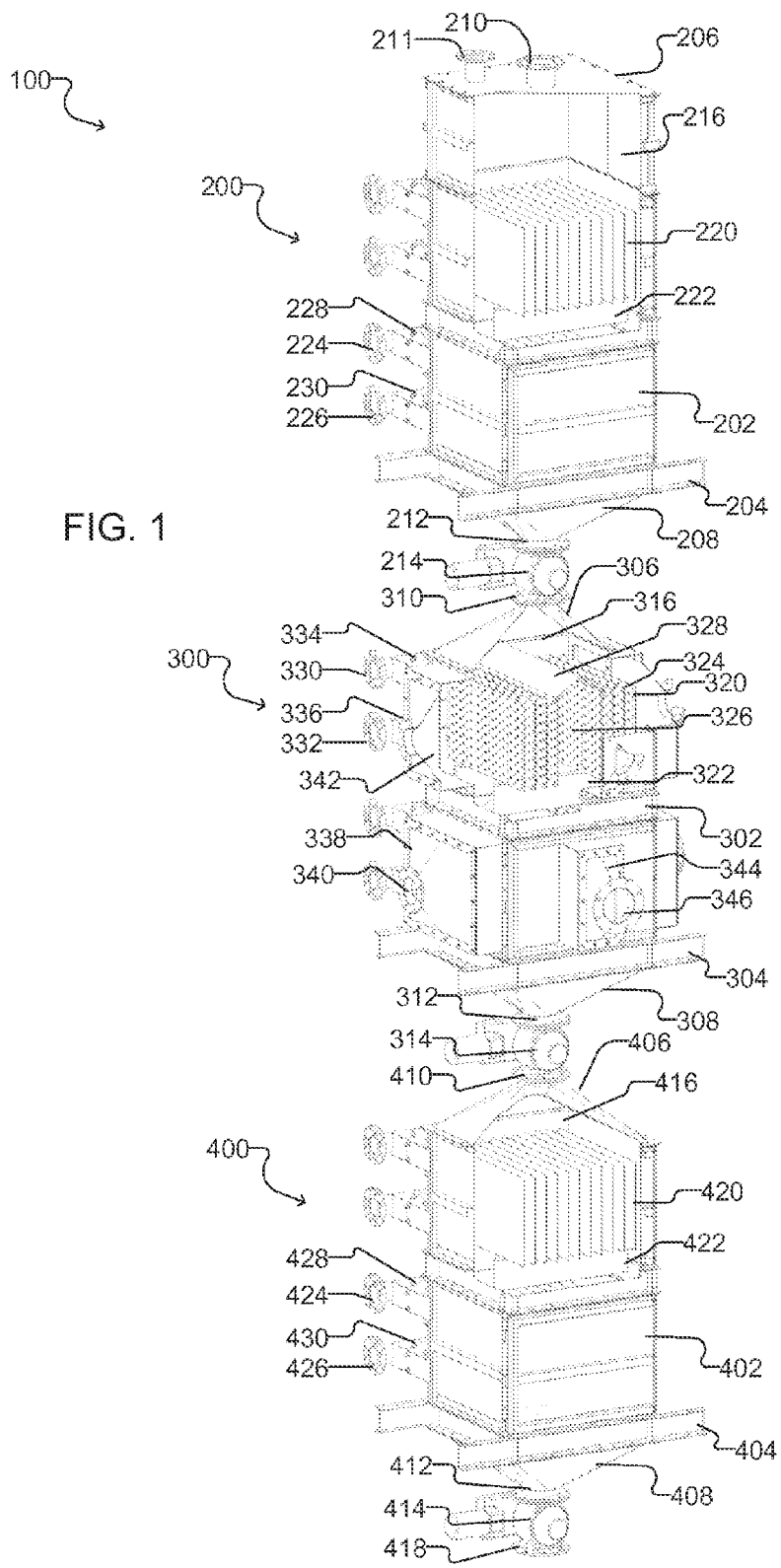
FIG. 1 is a perspective view of a torrefaction reactor according to an embodiment with a portion cut away to show detail.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to torrefaction reactors for treating biomass materials. The torrefaction reactor is utilized for the torrefaction of biomass materials and may also be utilized for other biomass upgrading processes including, for example, drying, dewatering, and partial degasification of biomass materials.

When wood or other biomass materials, such as but not limited to straw, are heated, water is lost through evaporation and the temperature of the biomass material does not rise above 100° C. until free water is evaporated and a residual, bound water content of approximately 10% is reached. When heating of the biomass material continues, most of this residual, bound water is released and chemical reactions in the dried residue, referred to as torrefaction, begin when a temperature of approximately 200° C. is reached. The cellulose, lignin, and the hemicellulose present in the residue partially decompose and generate volatile organic products such as acetic acid, methanol, acetone, phenols, and a range of other decomposition products. Because the decomposition reactions may involve a dehydration reaction, water may also be formed and released together with the combustible organic decomposition products. Because the decomposition products are oxygen-rich and include a substantial amount of water, the specific energy content of the biomass material increases during torrefaction.

Although the torrefaction reactions start to occur at a temperature of approximately 200° C., a temperature of approximately 250° C. may be utilized for the rate of the reaction to be sufficient for commercial conversion of biomass materials. Heating to a temperature of less than approximately 300° C. is advantageous to reduce the chance of pyrolysis and the resulting production of charcoal. The optimal torrefaction conditions that lead to a torrified product that can be easily ground into a powder and pelletized, while retaining maximum energy content, depend on the particular biomass material that is torrified.

A variety of different biomass materials that have different water contents may be utilized. Biomass material may be, for example, wood chips or wood pellets derived from, for example, trees, such as poplar or willow trees that are grown as energy crop or from non-timber parts of trees that are grown for timber, or demolition wood or untreated wood from crates and pallets that are collected by recycling centres. Biomass material may also include, for example, agricultural by-products such as straw or empty oil palm fruit bunches, or comminuted energy crops such as elephant grass (*Miscanthus giganteus*). Depending on the biomass material utilized, wood may be comminuted into chips or wood pellets sized approximately 10×20×30 mm or less in preparation for torrefaction. Straw and grass may be cut into lengths of, for example, approximately 40 mm in preparation for torrefaction.

Referring to FIG. 1, a perspective view of an embodiment of a torrefaction reactor 100 with a portion cut away is shown. The torrefaction reactor 100 includes a preheater section 200, a torrefaction section 300, and an optional cooling section 400. The preheater section 200, the torrefaction section 300, and the cooling section 400 of the torrefaction reactor 100 shown in the example of FIG. 1 are in a stacked arrangement to facilitate the flow of a biomass material sequentially through the sections of the torrefaction reactor 100 under the force of gravity.

The preheater section 200 is enclosed within a generally rectangular preheater housing 202. Preheater housing supports 204 support the preheater housing 202. The preheater housing 202 includes a top 206 and a bottom 208. The top 206 of the preheater housing 202 includes an inlet 210 for introducing biomass material into the torrefaction reactor 100 and a vent 211 for removing any volatiles that may be produced in the preheater section 200. The bottom 208 of the preheater housing 202 includes an outlet 212 that is coupled to an inlet of a rotary airlock 214 valve such that biomass material flows out through the outlet 212 and into the rotary airlock 214. The rotary airlock 214 seals the preheater section 200 from the torrefaction section 300 while facilitating the flow of biomass material from the preheater section 200 to the torrefaction section 300.

The preheater section 200 includes a plurality of preheater plates 220 disposed within the preheater housing 202. The preheater plates 220 are arranged in rows, referred to herein as banks. The preheater section 200 shown in the example of FIG. 1 includes two banks of preheater plates 220 spaced vertically apart. The preheater plates 220 of each bank are spaced horizontally apart and arranged generally parallel to each other. The preheater plates 220 are supported within the preheater housing 202 by preheater plate support members 222 located at the bottom of each bank of preheater plates 220. Each preheater plate 220 of the preheater section 200 extends horizontally from one sidewall of the preheater housing 202 to an opposing sidewall. The spaces between adjacent preheater plates 220 provide passageways for the biomass material to flow through the preheater section 200 under the force of gravity.

Each preheater plate 220 includes a pair of metal sheets that may be formed of stainless steel, such as 316L stainless steel. A space in between the pair of metal sheets facilitates flow of a heated preheater fluid through the preheater plates 220. To construct each preheater plate 220, the two metal sheets are arranged generally parallel to each other and seam welded along the edges. The two metal sheets are also spot welded together at a plurality of locations. The welded sheets are inflated to form the space between the sheets through which the heated preheater fluid may flow. The spot welds in the sheets form dimples (not shown) in the preheater plates 220 when the sheets are inflated. The dimples structurally strengthen preheater plates 220 such that the preheater plates 220 are able to withstand the internal pressure that is caused by a preheater fluid flowing through the preheater plates 220.

The rate of heat transfer from the preheater plates 220 to the biomass material is dependent on the distance that adjacent preheater plates 220 in a bank are spaced apart. The flow properties of the biomass material through the spaces between the preheating plates 220 is utilized to determine the minimum spacing between adjacent preheating plates 220. The time required for the biomass material to be heated is utilized to determine the total heat transfer area of the preheating plates 220 that is utilized.

The uppermost bank of preheater plates 220, which is the bank that is located closest to the inlet 210, is sufficiently spaced from the inlet 210 to provide a feed hopper 216 in between the inlet 210 and the preheater plates 220. The hopper 216 facilitates distribution of the biomass material that flows from the inlet 210, as a result of the force of gravity, over the preheater plates 220 of the upper bank. The lowermost bank of preheater plates 220, which is the bank that is located closest to the outlet 212, is sufficiently spaced from the outlet 212 to facilitate the flow of the biomass material through the outlet 212. The bottom 208 of the preheater housing 202 may form a discharge hopper that, together with the rotary airlock 214, creates a mass flow or "choked flow" of the biomass material to regulate the flow rate of the biomass material through the preheater section 200. The term "choked flow" is utilized herein to refer to a flow other than a free fall of the biomass material as a result of the force of gravity.

The preheater section 200 includes a preheater fluid inlet manifold 224 and a preheater fluid discharge manifold 226 for each bank of preheater plates 220 within the preheater section 200. Each of the preheater fluid inlet manifolds 224 is in fluid communication with each of preheater plates 220 of a respective bank via a preheater fluid inlet line 228 that connects the preheater fluid inlet manifold 224 to a preheater plate inlet (not shown) located in an upper portion of each preheater plate 220. Similarly, each of the preheater fluid discharge manifolds 226 is in fluid communication with each of preheater plates 220 of a respective bank via a preheater fluid discharge line 230 that connects the preheater fluid discharge manifold 226 to a preheater plate outlet (not shown) located in a lower portion of each preheater plate 220.

Heated preheater fluid is delivered to the preheater section 200 by the preheater fluid inlet manifold 224 and flows into each of the preheater plates 220 of a respective bank of preheater plates 220 through the preheater fluid inlet lines 228 connected to the preheater plate inlets. The heated preheater fluid flows downward through the preheater plates 220, co-current to the flow of biomass material through the preheater section 200. The preheater fluid exits through the preheater plate outlets, into the preheater fluid discharge manifold 226 via the preheater fluid discharge lines 230.

The preheater fluid flowing through the preheater plates 220 may be one of a thermal oil, steam, or a high temperature gas, such as a hot flue gas. The flow of preheater fluid through the preheater plates 220 is isolated from the biomass material that flows through the spaces between the preheater plates 220. The heated preheater fluid that flows through the preheater plates 220 indirectly heats the biomass material in the preheater section 200 as the biomass material moves downward through the preheater section 200.

The torrefaction section 300 is enclosed within a generally rectangular torrefaction housing 302. Torrefaction housing supports 304 support the torrefaction housing 302. The torrefaction housing 302 includes a top 306 and a bottom 308. The top 306 of the torrefaction housing 302 includes an inlet 310 coupled to an outlet of the rotary airlock 214 such that the biomass material that exits the preheater section 200 through the rotary airlock 214, enters the torrefaction section 300 through the inlet 310. The bottom 308 of the torrefaction housing 302 includes an outlet 312 that is coupled to an inlet of a rotary airlock 314 valve such that the biomass material exiting the torrefaction section 300 through the outlet 312 enters into the rotary airlock 314. The rotary airlocks 214 and 314 substantially seal the torrefaction section 300 from the preheater section 200 and the cooling section 400 while facilitating the flow of biomass material from the preheater section to the torrefaction section 300 and from the torrefaction section 300 to the cooling section 400.

The torrefaction section 300 includes a plurality of torrefaction plates 320 disposed within the torrefaction housing 302. The torrefaction plates 320 are arranged in banks. The torrefaction section 300 shown in the example of FIG. 1 includes two banks of torrefaction plates 320 spaced vertically apart. The torrefaction plates 320 of each bank are spaced horizontally apart and arranged generally parallel to each other. The torrefaction plates 320 are supported within the torrefaction housing 302 by torrefaction plate support members 322 located at the bottom of each bank of torrefaction plates 320. Each torrefaction plate 320 of the torrefaction section 300 extends horizontally from one sidewall of the torrefaction housing 302 to an opposing sidewall. The spaces between adjacent torrefaction plates 320 provide passageways for the biomass material to flow through. Each torrefaction plate 320 includes openings 324 therein that are sealed around their peripheries. The openings 324 facilitate passing a purge gas through the torrefaction plates 320, as discussed in more detail below.

Each torrefaction plate 320 includes a pair of metal sheets that may be formed of stainless steel, such as 316L stainless steel. A space in between the pair of metal sheets facilitates flow of a torrefaction fluid through the torrefaction plates 320. To construct each torrefaction plate 320, the two metal sheets are arranged generally parallel to each other and seam welded along the edges. The two metal sheets are also spot welded together at a plurality of locations. The welded sheets are inflated to form the space between the sheets through which the torrefaction fluid may flow. The spot welds in the sheets form dimples (not shown) in the torrefaction plates 320 when the sheets are inflated. The dimples structurally strengthen torrefaction plates 320 such that the torrefaction plates 320 are able to withstand the internal pressure that may be caused by a torrefaction fluid flowing through the torrefaction plates 320. The inside portion of the spot welds may be cut out to provide the openings 324 in the torrefaction plates, with the outer portion of the spot weld sealing the torrefaction plates 320 around the peripheries of the openings 324.

The rate of heat transfer from the torrefaction plates 320 to the biomass material is dependent on the distance that adjacent torrefaction plates 320 in a bank are spaced apart. The flow properties of the biomass material through the spaces between the torrefaction plates 320 is utilized to determine the minimum spacing between adjacent torrefaction plates 320. The time required for the torrefaction reaction to proceed is utilized to determine the total heat transfer area of the torrefaction plates 320 that is utilized.

The two innermost torrefaction plates 320 of each bank are spaced further apart than the spacing between other adjacent torrefaction plates 320, providing a gap 326 in the center portion of each of the banks of torrefaction plates 320. A cover 328 extends over the gap 326 in the central portion of the banks of torrefaction plates 320. The cover 328 diverts the biomass material away from the gap 326 and toward the spaces between the torrefaction plates 320 on either side of the gap 326.

The uppermost bank of torrefaction plates 320, which is the bank that is located closest to the inlet 310, is sufficiently spaced from the inlet 310 such that the top 306 of the torrefaction housing 302 forms a feed hopper 316 between the inlet 310 and the upper bank of torrefaction plates 320. The hopper 316 facilitates distribution of the biomass material that flows from the inlet 310, as a result of the force of gravity, over the torrefaction plates 320 of the upper bank.

The lowermost bank, which is the bank that is located closest to the outlet 312, is sufficiently spaced from the outlet 312 to facilitate the flow of the biomass material through the outlet 312. The bottom 308 of the torrefaction housing 302 may form a discharge hopper that, together with the rotary airlock 314, creates a choked flow of the biomass material to regulate the flow rate of the biomass material through the torrefaction section 300.

The torrefaction section 300 includes a torrefaction fluid inlet manifold 330 and a torrefaction fluid discharge manifold 332 for each bank of torrefaction plates 320. Each of the torrefaction fluid inlet manifolds 330 is in fluid communication with each of the torrefaction plates 320 of a respective bank via a torrefaction fluid inlet line 334 that connects the torrefaction fluid inlet manifold 330 to a torrefaction plate inlet (not shown) located in an upper portion of each torrefaction plate 320. Each of the torrefaction fluid discharge manifolds 332 is in fluid communication with each of the torrefaction plates 320 of a respective bank via a torrefaction fluid discharge line 336 that connects the torrefaction fluid discharge manifold 332 to a torrefaction plate outlet (not shown) located in a lower portion of each torrefaction plate 320.

Torrefaction fluid is delivered to the torrefaction section 300 by the torrefaction fluid inlet manifold 330 and flows into each torrefaction plate 320 through the torrefaction fluid inlet lines 334 connected to the torrefaction plate inlet. The heated torrefaction fluid flows downwardly through the torrefaction plates 320, co-current to the flow of biomass material through the torrefaction section 300. The torrefaction fluid exits through the torrefaction plate outlets and into the torrefaction fluid discharge manifold 332 via the torrefaction fluid discharge lines 336.

The flow of torrefaction fluid through the torrefaction plates 320 is isolated from the biomass material that flows through the spaces between the torrefaction plates 320. The heated torrefaction fluid that flows through the torrefaction plates 320 indirectly heats the biomass material in the torrefaction section 300. The torrefaction fluid flowing through the torrefaction plates 320 may be one of a thermal oil, steam, or a high temperature gas, such as a hot flue gas.

The torrefaction housing 302 of the torrefaction section 300 shown in the example of FIG. 1 includes two pairs of torrefaction purge gas inlets 338, each pair associated with a respective bank of torrefaction plates 320. The torrefaction housing 302 shown in the example of FIG. 1 also includes two torrefaction purge gas outlets 344 such that one torrefaction purge gas outlet 344 is associated with each bank of torrefaction plates 320. Each bank of torrefaction plates 320, along with the associated pair of torrefaction purge gas inlets 338 and the torrefaction purge gas outlet 344 are referred to herein as a torrefaction module.

The torrefaction purge gas inlets 338 extend from the sidewalls of the housing 302 that are oriented parallel to the torrefaction plates 320 such that the torrefaction purge gas inlets 338 of each pair extend from opposing sidewalls on either side of the respective bank of torrefaction plates 320. The torrefaction purge gas outlets 344 extend from the sidewall of the housing 302 that is oriented perpendicular to the torrefaction plates 320 and is opposite the sidewall that includes the torrefaction inlet manifold 330 and the torrefaction discharge manifold 332.

The torrefaction purge gas inlets 338 extend from an area of the housing 302 that is approximately equal to the area of the torrefaction plates 320. Each of the torrefaction purge gas inlets 338 includes an inlet opening 340 that is approximately centered on the torrefaction purge gas inlet 338 such that the inlet openings 340 of one pair of torrefaction purge gas inlets 338 are approximately centered on the center of the torrefaction plates 320 of a respective bank of torrefaction plates 320. The torrefaction purge gas inlets 338 protrude from the torrefaction housing 302 to provide inlet cavities 342 between the vent opening 340 and the torrefaction plates 320.

Each torrefaction purge gas outlets 344 extends from an area of the torrefaction housing 302 that is approximately equal to the cross-sectional area of the gap 326 of the respective bank of torrefaction plates 320. Each of the torrefaction purge gas outlets 344 includes an outlet opening 346 that is approximately centered on the gap 326 of the respective bank of torrefaction plates 320.

Figure 2:
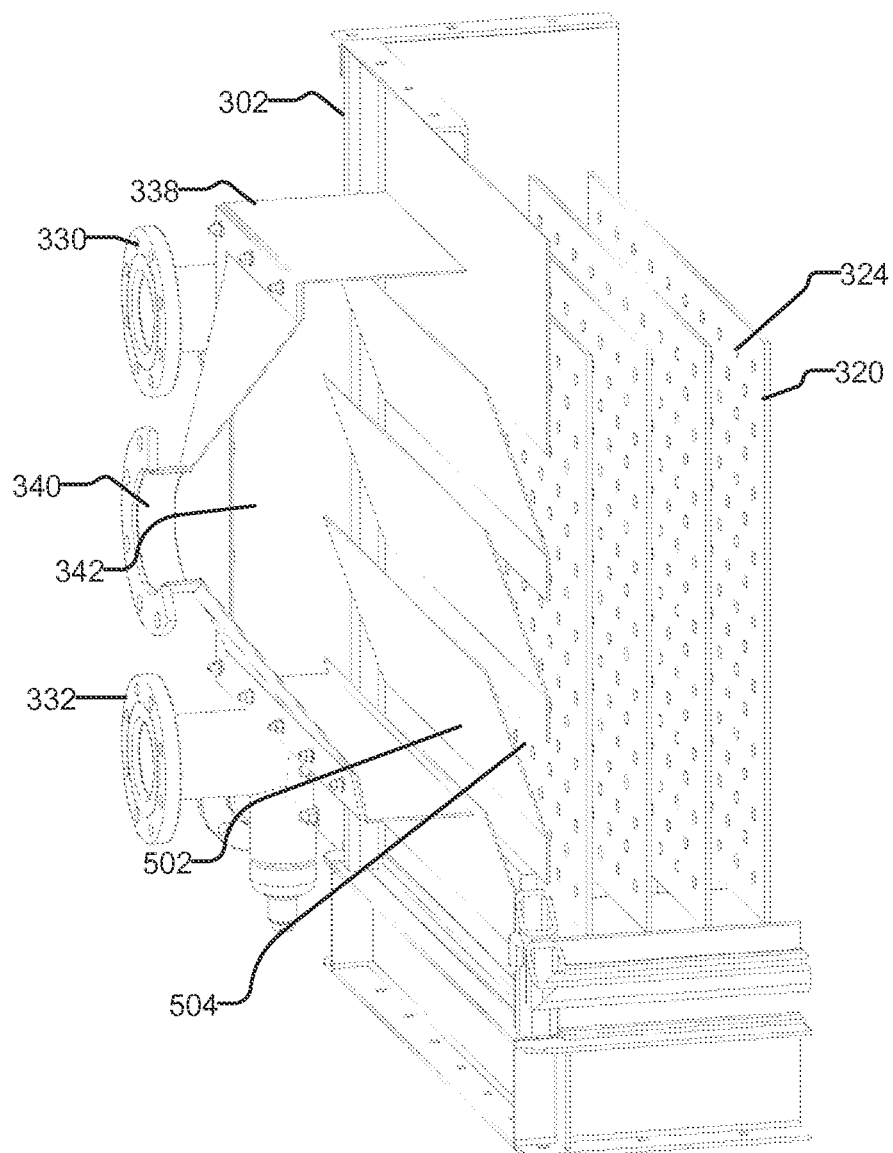
FIG. 2 is a perspective view of a portion of the torrefaction reactor illustrated in FIG. 1 with a portion cut away.

As shown in FIG. 2, the torrefaction purge gas inlets 338 include a plurality of louvers 502 within the inlet cavity 342. The louvers 502 begin at a point near the torrefaction plates 320 and extend upwardly away from the torrefaction plates 320 such that the louvers extend into the inlet cavity 342. The louvers may be inclined at an angle of, for example, 70° from horizontal. Adjacent louvers 502 overlap, but are spaced apart so as to provide louver openings 504 through which the purge gas may flow, while inhibiting the biomass material in the torrefaction section 300 from entering into the inlet cavities 342 of the torrefaction purge gas inlets 338.

The torrefaction purge gas inlets 338, the torrefaction purge gas outlets 344, along with the openings 324 in the torrefaction plates 320, facilitate a crossflow of a torrefaction purge gas through the torrefaction modules of the torrefaction section 300. The torrefaction purge gas enters a module of the torrefaction section 300 through the torrefaction purge gas inlets 338 on opposing sides of the module. The torrefaction purge gas flows through the openings 324 in the torrefaction plates 320 toward the gap 326. Torrefaction purge gas within the gap exits the torrefaction section 300 through the torrefaction purge gas outlet 344.

The torrefaction purge gas may be utilized to create the oxygen depleted environment within the torrefaction section 300 for the torrefaction process of the biomass material to occur. The torrefaction purge gas may be heated to provide direct heating to the biomass material in the torrefaction section 300 in addition to the indirect heating from the torrefaction plates 320. The flow of torrefaction purge gas through the torrefaction section 300 may also remove volatiles and other decomposition material that are produced during the torrefaction of biomass material in the torrefaction section 300. The torrefaction purge gas may be, for example, superheated steam or hot flue gases. For example, the torrefaction purge gas may be the hot flue gas produced by the furnace utilized to heat the torrefaction fluid flowing through the torrefaction plates 320.

The optional cooling section 400 is enclosed within a generally rectangular cooling housing 402. Cooling housing supports 404 support the cooling housing 402. The cooling housing 402 includes a top 406 and a bottom 408. The top 406 of the cooling housing 402 includes an inlet 410 that is coupled to an outlet of the rotary airlock 314 such that the biomass material that exits the torrefaction section 300 enters the cooling section 400. The bottom 408 of the cooling housing 402 includes an outlet 412 that is coupled to an inlet of a rotary airlock 414 valve such that the biomass material that exits through the outlet 410 enters the rotary airlock 414, which passes the biomass material out of the torrefaction reactor 100 through outlet 418. The rotary airlock 414 substantially seals the cooling section 400 from the environment external to the torrefaction reactor 100 while facilitating the flow of biomass material out of the cooling section 400.

The cooling section 400 includes a plurality of cooling plates 420 disposed within the cooling housing 402. The cooling plates 420 are arranged in banks. The cooling section 400 shown in the example of FIG. 1 includes two banks of cooling plates 420 spaced vertically apart. The cooling plates 420 of each bank are spaced horizontally apart and arranged generally parallel to each other. The cooling plates 420 are supported within the cooling housing 402 by cooling plate support members 422 located at the bottom of each bank of cooling plates 420. Each cooling plate 420 of the cooling section 400 extends horizontally from one sidewall of the cooling housing 402 to an opposing sidewall. The spaces between adjacent cooling plates 420 provide passageways for the biomass material to flow through.

Each cooling plate 420 includes a pair of metal sheets that may be formed of stainless steel, such as 316L stainless steel. A space in between the pair of metal sheets facilitates the flow of a cooling fluid through the cooling plates 420. To construct each cooling plate 420, the two metal sheets are arranged generally parallel to each other and seam welded along the edges. The two metal sheets are also spot welded together at a plurality of locations. The welded metal sheets are inflated to form the space between the metal sheets through which a cooling fluid may flow. The spot welds in the sheets form dimples (not shown) in the cooling plates 420 when the sheets are inflated. The dimples structurally strengthen cooling plates 420 such that the cooling plates 420 are able to withstand the internal pressure that may be caused by the cooling fluid flowing through the cooling plates 420.

The uppermost bank of cooling plates 420, which is the bank that is located closest to the inlet 410, is sufficiently spaced from the inlet 410 to provide a feed hopper 416 in between the inlet 410 and the cooling plates 420. The hopper 416 facilitates distribution of the biomass material that flows from the inlet 410, as a result of the force of gravity, over the cooling plates 420 of the upper bank. The lowermost bank, which is the bank that is located closest to the outlet 412, is sufficiently spaced from the outlet 412 to facilitate the flow of the biomass material through the outlet 412. The bottom 408 of the cooling housing 402 may form a discharge hopper that, together with the rotary airlock 414, creates a choked flow of the biomass material to regulate the flow rate of the biomass material through the cooling section 400.

The cooling section 400 includes a cooling fluid inlet manifold 424 and a cooling fluid discharge manifold 426 for each bank of cooling plates 420 within the cooling section 400. Each of the cooling fluid inlet manifolds 424 is in fluid communication with each of cooling plates 420 of a respective bank via a cooling fluid inlet line 428 that connects the cooling fluid inlet manifold 424 to a cooling plate inlet (not shown) located in an upper portion of each cooling plate 420. Similarly, each of the cooling fluid discharge manifolds 226 is in fluid communication with each of cooling plates 420 of a respective bank via a cooling fluid discharge line 430 that connects the cooling fluid discharge manifold 426 to a cooling plate outlet (not shown) located in a lower portion of each cooling plate 420.

Cooling fluid is delivered to the cooling section 400 by the cooling fluid inlet manifold 424 and flows into each of the cooling plates 420 of a respective bank of cooling plates 420 through the cooling fluid inlet lines 428 connected to the cooling plate inlets. The cooling fluid flows downward through the cooling plates 420, co-current to the flow of biomass material through the cooling section 400. The cooling fluid exits the cooling plates 420 through the cooling plate outlets and into the cooling fluid discharge manifold 426 via the cooling fluid discharge lines 430.

The cooling fluid that flows through the cooling plates 420 may be one of a thermal oil, water, or glycol. The flow of cooling fluid through the cooling plates 420 is isolated from the biomass material that flows through the spaces between the cooling plates 420. The cooling fluid that flows through the cooling plates 420 indirectly cools the biomass material in the cooling section 400 as the biomass material moves downward through the cooling section 400.

Although the flow of the torrefaction purge gas is described above as flowing into the torrefaction section 300 through the torrefaction purge gas inlets 338 and out through the torrefaction purge gas outlets 344, in an alternate embodiment, the flow of torrefaction purge gas may be reversed such that the torrefaction purge gas enters the torrefaction section 300 through the torrefaction purge gas outlets 344 and exits through the torrefaction purge gas inlets 338. In another alternative embodiment, the torrefaction purge gas outlets 344 may be omitted, and one of the torrefaction purge gas inlets 338 is utilized as an outlet, and the other is utilized as the inlet such that the torrefaction purge gas flows across the torrefaction section 302 from one side to an opposite side. In another embodiment, rather than flowing through holes 324 in the torrefaction plates 320, the holes 324 may be omitted and the torrefaction plates 320 may be oriented substantially perpendicular to the sides of the torrefaction housing 302 from which the pair of torrefaction purge gas inlets 338 extend such that the torrefaction purge gas may flow from one side of the torrefaction housing 302 to an opposite side through the spaces between the torrefaction plates 320.

Figure 3:
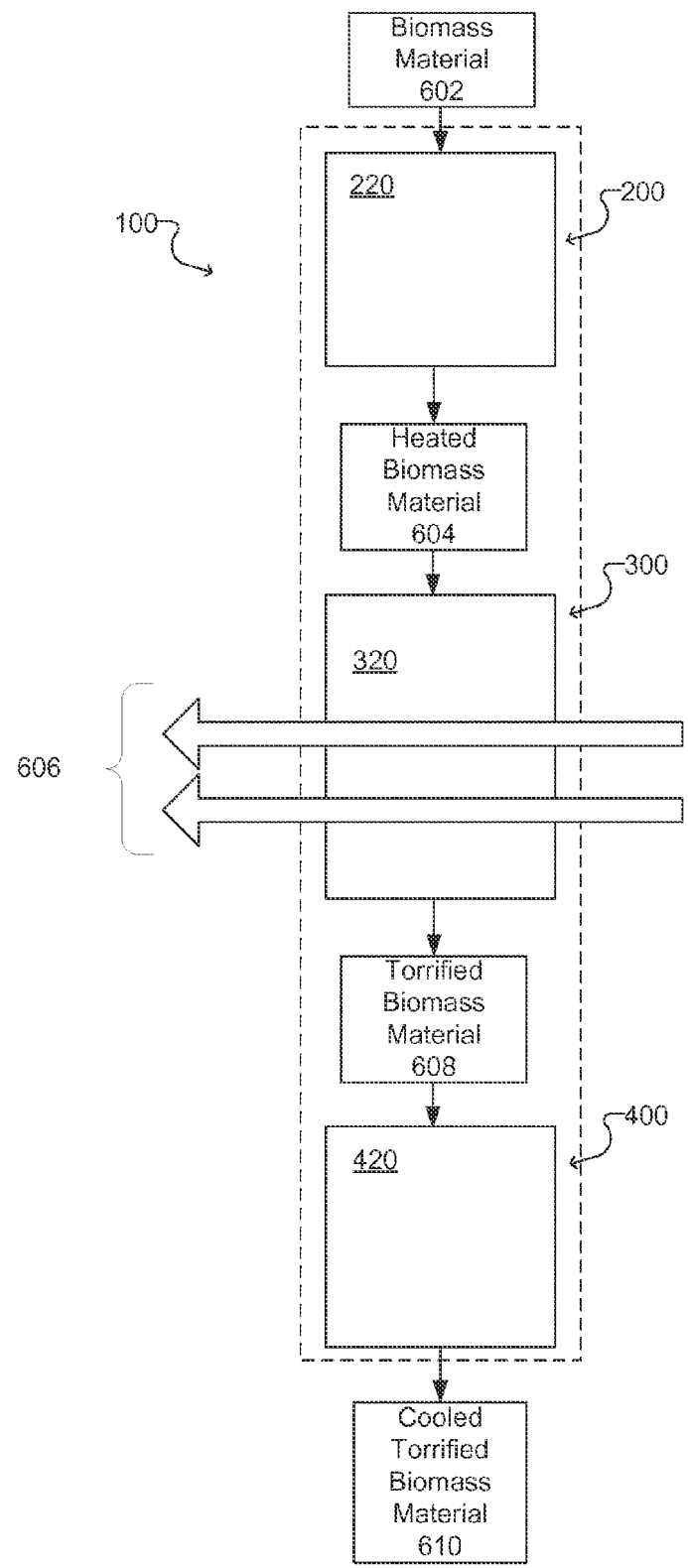
FIG. 3 is a schematic view of a torrefaction reactor according to an embodiment.

FIG. 3 shows a schematic diagram the torrefaction reactor 100 in operation. The biomass material 602 is introduced into the torrefaction reactor 100 at the preheater section 200. Heated preheater fluid is delivered to the preheater plates 220 of the preheater section 200 via the preheater fluid inlet manifold 224 to indirectly heat the biomass material 602 in the preheater section 200 to a temperature less than a torrefaction temperature. For example, the preheater section 200 may heat the biomass material 602 to a temperature in the range of between about 100° C. and about 150° C. For example, the preheater section 200 may heat the biomass material 602 to a temperature of about 120° C.

The preheater fluid may be heated utilizing a combustion furnace prior to delivery to the preheater plates 220. The temperature difference between the preheater plates 220 and the biomass material 602 affects the rate of heat transfer from the preheater plates 220 to the biomass material 602. Increasing the temperature of the preheater fluid increases the temperature differential between the dyer plates 220 and the biomass material 602, which increases the rate of heat transfer per unit of surface of the preheater plates 220. Increasing the rate of heat transfer per unit of surface area of the preheater plates 220 decreases the overall surface area utilized to heat the biomass material 602, thus fewer preheater plates 220 may be utilized to generate heating equal to a greater number of preheater plates 220 that have a lower temperature differential. The heat of the preheater fluid is controlled such that the preheater plates 220 are not so hot that undesirable side-reactions occur. For example, very high preheater plate 220 temperatures may cause localized heating of the biomass material 602 in contact with the plates to temperatures exceeding 300° C., at which pyrolysis may occur, leading to the production of charcoal. Further, utilizing a very hot preheater fluid to heat a much cooler biomass material 602 reduces the efficiency of the torrefaction reactor 100.

After exiting the preheater section 200, the heated biomass material 604 enters the torrefaction section 300. The environment within the torrefaction housing 302 is oxygen-depleted in order for the thermochemical torrefaction process to occur. The torrefaction purge gas 606 that flows through the torrefaction section 300 generates the oxygen-depleted environment by displacing the oxygen introduced from the preheater section 200 through the rotary airlock 214. The oxygen of the torrefaction housing 402 may additionally be displaced by blanketing the interior of the torrefaction housing 302 with an inert gas.

In addition to depleting the oxygen within the torrefaction housing 302, the torrefaction purge gas 606 may be heated to directly heat the dried biomass material 604. The heated torrefaction purge gas 606 may be, for example, hot flue gases or superheated steam. For example, the purge gas 606 may be the hot flue gas produced by the furnace utilized to heat the preheater fluid and the torrefaction fluid.

Further, the purge gas 606 removes combustibles that are produced during the torrefaction process. The extracted combustibles may be delivered to the furnace that heats the preheater fluid and the torrefaction fluid to be utilized to produce heat utilized for subsequent torrefaction of the biomass material. The combustibles may be burned in the furnace together with other fuel, such as coal. The extracted combustibles may include, for example, volatiles, dust, and tar.

The heated biomass material 604 in the torrefaction section 300 is heated by indirect heating from the torrefaction plates 320. The heated biomass material 604 may also be directly heated by a heated purge gas 606.

The heated biomass material 604 may be torrified in the torrefaction section 300 in several stages. For example, during a "pre-torrefaction stage", the temperature of heated biomass material 604 may be heated to a torrefaction temperature of between, for example, approximately 250-280° C. During a "holding stage", after the pre-torrefaction stage, the temperature of the heated biomass material 604 may be maintained at the torrefaction temperature for a period of time in order for the torrefaction process to occur. During the holding stage, the heated biomass material 604 decreases in mass due to the generation of combustible vapours during the torrefaction process. After the holding stage, the temperature of the heated biomass material 604 in the torrefaction section 300 may be cooled during a "cooling stage" to approximately 200° C.

A heated torrefaction fluid is delivered to the torrefaction plates 320 of the torrefaction section 300 during the pre-torrefaction and holding stages. The torrefaction fluid may be heated in a combustion furnace prior to delivery to the torrefaction plates 320. The torrefaction fluid that is delivered to the torrefaction plates 320 during the cooling stage is not heated in order to cool the heated biomass material 604 prior to exiting the torrefaction section 300. The torrefaction fluid temperature differential between the torrefaction fluid and the heated biomass material 604 affects the rate of heat transfer between the torrefaction plates 320 and the heated biomass material 604 which, in turn, affects the overall surface area of torrefaction plates 320 to heat the heated biomass material 604.

During the pre-torrefaction and holding stages, the heated biomass material 604 may also be directly heated by a heated torrefaction purge gas 606 in addition to indirect heating from the torrefaction fluid flowing through the torrefaction plates 320. During the cooling stage, an unheated, or a cooled, torrefaction purge gas 606 may be passed through to the torrefaction section 300 to remove combustibles without heating the heated biomass material 604.

After passing through the torrefaction section 300, the torrified biomass material 608 may be delivered to an optional cooling section 400 to further reduce the temperature of the torrified biomass material 608 prior to exiting the torrefaction reactor 100.

Because the cooling section 400 is sealed from the external environment by the rotary airlock 414, the environment within the cooling section 400 is also oxygen-depleted. The cooling section 400 may also be blanketed in an inert gas to increase the oxygen-depletion within the cooling housing 402. Oxygen-depletion within the cooling housing 402 inhibits spontaneous combustion of the torrified biomass material 608 within the cooling section 400.

The cooling fluid is delivered to the cooling plates 420 of the cooling section 400 via the cooling fluid inlet manifold 424 to indirectly cool the torrified biomass material 608 in the cooling section 400. Heat from the biomass material is transferred to the cooling fluid, heating the cooling fluid. The cooling section 400 may cool the biomass material to a temperature of less than 200° C., for example, about 50° C.

After passing through the optional cooling section 400, the cooled, torrified biomass material 610 exits the torrefaction reactor 100. In the absence of the optional cooling section 400, the torrified biomass material 608 exits the torrefaction reactor 100 after passing through the torrefaction section 300 though the rotary airlock 314. The torrified biomass material 608 may be air-cooled outside the torrefaction reactor 100 in the ambient environment.

The cooled torrified biomass material 610 may then be used as fuel, or may be sent for further processing. Further processing may include, for example, densification of the cooled torrified biomass material 610 into pellets, or other form, that facilitates storing and shipping of cooled torrified biomass material 610.

Each of the preheater fluid, the torrefaction fluid, and the cooling fluid of the torrefaction reactor 100 may be delivered in separate closed loops. Alternatively, delivery of the preheater fluid, the torrefaction fluid, and the cooling fluid may form a single closed loop. For example, the torrefaction fluid may be heated in a furnace and delivered to the torrefaction plates 320 of the torrefaction section 300. Heat from the torrefaction fluid 320 is transferred to the heated biomass material 604 flowing between the spaces between adjacent torrefaction plates 320, cooling the torrefaction fluid. The torrefaction fluid that exits the torrefaction section 300 is delivered directly to the preheater plates 220 of the preheater section 220 and utilized as preheater fluid in the preheater section 200. Heat from the preheater fluid is transferred the biomass material 602 flowing between the spaces between adjacent preheater plates 220, cooling the preheater fluid. The cooled preheater fluid that exits the preheater section 200 is delivered directly to the cooling section 400 and utilized as cooling fluid in the cooling section 400. Heat from the torrified biomass material 608 in the cooling section 400 is transferred to the cooling fluid, heating the cooling fluid. The heated cooling fluid is then delivered back to the furnace to be reheated and utilized as torrefaction fluid.

Utilizing a single, closed loop for the preheater fluid, the torrefaction fluid, and the cooling fluid increases the overall energy efficiency of the torrefaction reactor 100 because heat removed from the biomass material in the cooling section 400 is utilized to heat the biomass material in the preheater section 200 and the torrefaction section 300.

In one example, in a single closed loop system for the preheater, torrefaction, and cooling fluids, a torrefaction fluid is heated to a temperature of about 350° C. in a furnace prior to delivery to the torrefaction section 300. The temperature of the biomass material in the torrefaction section 300 is raised from about 120° C. to close to about 300° C., causing the temperature of the torrefaction fluid to cool to about 200° C. by the time the fluid exits the torrefaction section 300. The torrefaction fluid that exits the torrefaction section 300 is then utilized as preheater fluid and is delivered to the preheater section 200. In the preheater section 200, the temperature of the preheater fluid drops from about 200° C. to about 50° C. through heat exchange to the biomass material in the preheater section 200. The preheater fluid that exits the preheater section 200 is then utilized as cooling fluid and is delivered to the cooling section 400. During cooling, the temperature of the cooling fluid in the cooling section rises in temperature from about 50° C. to about 150° C. From the cooling section 400, the cooling fluid is delivered back to a furnace to be reheated to about 350° C. and utilized as torrefaction fluid.

Although FIG. 1 shows that each of the preheater section 200, the torrefaction section 300, and the cooling sections 400 of the torrefaction reactor 100 include two banks of heat transfer plates, any of the preheater section 200, the torrefaction section 300, or the cooling section 400 may include fewer or greater than two banks. The preheater section 200, the torrefaction section 300, and the cooling section 400 may include different numbers of banks. Further, the number of plates, and the spacing between adjacent heat transfer plates, may vary between the preheater section 200, the torrefaction section 300, and the cooling section 400. The number of plates, and the spacing between adjacent plates, may vary between the banks of plates within any one of the preheater section 200, the torrefaction section 300, and the cooling section 400 of torrefaction reactor 100.

For example, the various stages of the torrefaction process within the torrefaction section 300 may be associated with one or more torrefaction modules. In this arrangement, each of the stages of the torrefaction process is associated with a portion of the torrefaction section 300 such that, as the biomass material flows through the torrefaction section 300, the biomass material moves through the various stages of the torrefaction process. Because the energy utilized in each stage differs, the portions of the torrefaction section 300 associated with the stages of the torrefaction process may differ in any or all of the number of banks, the number of plates within the banks, the separation distance between adjacent plates, and the temperature of the fluid delivered to the plates.

Although FIG. 1 shows the preheater section 200, the torrefaction section 300, and the cooling section 400 of the torrefaction reactor 100 in a stacked arrangement, one or more of the preheater section 200, the torrefaction section 300, and the cooling section 400 may be arranged side-by-side. Side-by-side arrangement of one or more of the sections of the torrefaction reactor 100 may be utilized for practical reasons such as, for example, building height restrictions. In a side-by-side arrangement, dried biomass material 604 exiting the preheater section 200 may be conveyed upward to the inlet 310 of the torrefaction section 300 for the dried biomass material 604 to move downwardly through the torrefaction section under the force of gravity. Similarly, the torrified biomass material 608 that exits the torrefaction section 300 may be conveyed upward to the inlet 410 of the cooling section 400 for the torrified biomass material 608 to move downwardly through the cooling section 400 under the force of gravity. A conveyor belt or an Archimedes screw arrangement may be utilized to convey the biomass material between sections in the side-by-side arrangement.

Figure 4:
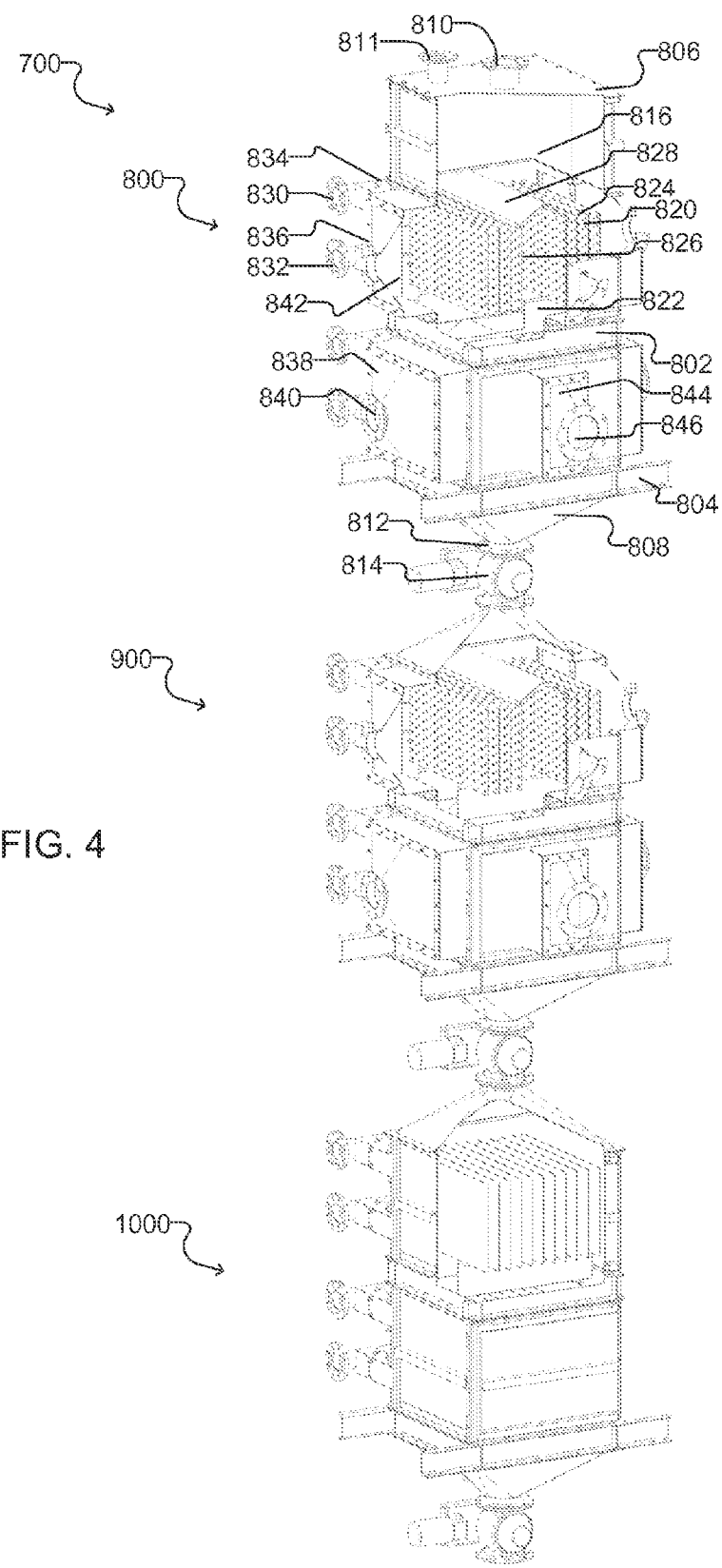
FIG. 4 is a perspective view of a torrefaction reactor according to an embodiment with a portion cut away to show detail.

Referring now to FIG. 4, a perspective view of an alternative embodiment of a torrefaction reactor 700 is shown. The torrefaction reactor 700 includes a dryer section 800, a torrefaction section 900, and an optional cooling section 1000 in a stacked arrangement to facilitate the flow of a biomass material sequentially through the sections of the torrefaction reactor 700 under the force of gravity.

The dryer section 800 heats the biomass material that enters the torrefaction reactor 700 similar to the heating performed by the preheater section 200 described above with reference to FIGS. 1 and 3. In addition to heating, the dryer section 800 dries the biomass material to remove moisture prior to torrefaction of the biomass material in the torrefaction section 900.

The dryer section 800 is enclosed within a generally rectangular dryer housing 802. Dryer housing supports 804 support the dryer housing 802. The dryer housing 802 includes a top 806 and a bottom 808. The top 806 of the dryer housing 802 includes an inlet 810 for introducing biomass material into the torrefaction reactor 700 and a vent 811 for removing any volatiles that may be produced in the dryer section 800. The bottom 808 of the dryer housing 802 includes an outlet 812 that is coupled to an inlet of a rotary airlock 814 valve such that biomass material flows out through the outlet 812 and into the rotary airlock 814. The rotary airlock 814 seals the dryer section 800 from the torrefaction section 900 while facilitating the flow of biomass material from the dryer section 800 to the torrefaction section 900.

The dryer section 800 includes a plurality of dryer plates 820 disposed within the dryer housing 802. The dryer plates 820 are arranged in banks. The dryer section 800 shown in the example of FIG. 4 includes two banks of dryer plates 820 spaced vertically apart. The dryer plates 820 of each bank are spaced horizontally apart and arranged generally parallel to each other. The dryer plates 820 are supported within the dryer housing 802 by dryer plate support members 822 located at the bottom of each bank of dryer plates 820. Each dryer plate 820 of the dryer section 800 extends horizontally from one sidewall of the dryer housing 802 to an opposing sidewall. The spaces between adjacent dryer plates 820 provide passageways for the biomass material to flow through. Each dryer plate 820 includes openings 824 therein that are sealed around their peripheries. The openings 824 facilitate passing a purge gas through the dryer plates 820, as discussed in more detail below.

Each dryer plate 820 includes a pair of metal sheets that may be formed of stainless steel, such as 316L stainless steel. A space in between the pair of metal sheets facilitates flow of a dryer fluid through the dryer plates 820. To construct each dryer plate 820, the two metal sheets are arranged generally parallel to each other and seam welded along the edges. The two metal sheets are also spot welded together at a plurality of locations. The welded sheets are inflated to form the space between the sheets through which the dryer fluid may flow. The spot welds in the sheets form dimples (not shown) in the dryer plates 820 when the sheets are inflated. The dimples structurally strengthen dryer plates 820 such that the dryer plates 820 are able to withstand the internal pressure that may be caused by a dryer fluid flowing through the dryer plates 820. The inside portion of the spot welds may be cut out to provide the openings 824 in the dryer plates, with the outer portion of the spot weld sealing the dryer plates 820 around the peripheries of the openings 824.

The rate of heat transfer from the dryer plates 820 to the biomass material is dependent on the distance that adjacent dryer plates 820 in a bank are spaced apart. The flow properties of the biomass material through the spaces between the dryer plates 820 is utilized to determine the minimum spacing between adjacent dryer plates 820. The time required for the biomass material to dry and heat is utilized to determine the total heat transfer area of the dryer plates 820 that is utilized.

The two innermost dryer plates 820 of each bank are spaced further apart than the spacing between other adjacent dryer plates 820, providing a gap 826 in the center portion of each of the banks of dryer plates 820. A cover 828 extends over the gap 826 in the central portion of the banks of dryer plates 820. The cover 828 diverts the biomass material away from the gap 826 and toward the spaces between the dryer plates 820 on either side of the gap 826.

The uppermost bank of dryer plates 820, which is the bank that is located closest to the inlet 810, is sufficiently spaced from the inlet 810 such that the top 806 of the dryer housing 802 forms a feed hopper 816 between the inlet 810 and the upper bank of dryer plates 820. The hopper 816 facilitates distribution of the biomass material that flows from the inlet 810, as a result of the force of gravity, over the dryer plates 820 of the upper bank.

The lowermost bank, which is the bank that is located closest to the outlet 812, is sufficiently spaced from the outlet 812 to facilitate the flow of the biomass material through the outlet 812. The bottom 808 of the dryer housing 802 may form a discharge hopper that, together with the rotary airlock 814, creates a choked flow of the biomass material to regulate the flow rate of the biomass material through the dryer section 800.

The dryer section 800 includes a dryer fluid inlet manifold 830 and a dryer fluid discharge manifold 832 for each bank of dryer plates 820. Each of the dryer fluid inlet manifolds 830 is in fluid communication with each of the dryer plates 820 of a respective bank via a dryer fluid inlet line 834 that connects the dryer fluid inlet manifold 830 to a dryer plate inlet (not shown) located in an upper portion of each dryer plate 820. Each of the dryer fluid discharge manifolds 832 is in fluid communication with each of the dryer plates 820 of a respective bank via a dryer fluid discharge line 836 that connects the dryer fluid discharge manifold 832 to a dryer plate outlet (not shown) located in a lower portion of each dryer plate 820.

Dryer fluid is delivered to the dryer section 800 by the dryer fluid inlet manifold 830 and flows into each dryer plate 820 through the dryer fluid inlet lines 834 connected to the dryer plate inlet. The heated dryer fluid flows downwardly through the dryer plates 820, co-current to the flow of biomass material through the dryer section 800. The dryer fluid exits through the dryer plate outlets and into the dryer fluid discharge manifold 832 via the dryer fluid discharge lines 836.

The flow of dryer fluid through the dryer plates 820 is isolated from the biomass material that flows through the spaces between the dryer plates 820. The heated dryer fluid that flows through the dryer plates 820 indirectly heats the biomass material in the dryer section 800. The dryer fluid flowing through the dryer plates 820 may be one of a thermal oil, steam, or a high temperature gas, such as a hot flue gas.

The dryer housing 802 of the dryer section 800 shown in the example of FIG. 4 includes two pairs of dryer purge gas inlets 838, each pair associated with a respective bank of dryer plates 820. The dryer housing 802 shown in the example of FIG. 4 also includes two dryer purge gas outlets 844 such that one dryer purge gas outlet 844 is associated with each bank of dryer plates 820. Each bank of dryer plates 820, along with the associated pair of dryer purge gas inlets 838 and the dryer purge gas outlet 844 are referred to herein as a dryer module.

The dryer purge gas inlets 838 extend from the sidewalls of the housing 802 that are oriented parallel to the dryer plates 820 such that the dryer purge gas inlets 838 of each pair extend from opposing sidewalls on either side of the respective bank of dryer plates 820. The dryer purge gas outlets 844 extend from the sidewall of the housing 802 that is oriented perpendicular to the dryer plates 820 and is opposite the sidewall that includes the dryer inlet manifold 830 and the dryer discharge manifold 832.

The dryer purge gas inlets 838 extend from an area of the housing 802 that is approximately equal to the area of the dryer plates 820. Each of the dryer purge gas inlets 838 includes an inlet opening 840 that is approximately centered on the dryer purge gas inlet 838 such that the inlet openings 840 of one pair of dryer purge gas inlets 838 are approximately centered on the center of the dryer plates 820 of a respective bank of dryer plates 820. The dryer purge gas inlets 838 protrude from the dryer housing 802 to provide inlet cavities 842 between the vent opening 840 and the dryer plates 820.

Each dryer purge gas outlet 844 extends from an area of the dryer housing 802 that is approximately equal to the cross-sectional area of the gap 826 of the respective bank of dryer plates 820. Each of the dryer purge gas outlets 844 includes an outlet opening 846 that is approximately centered on the gap 826 of the respective bank of dryer plates 820.

The dryer purge gas inlets 838 include a plurality of louvers (not shown) within the inlet cavity 842. The louvers in the dryer purge gas inlet 838 are similar to the louvers 502 in the torrefaction purge gas inlet 338, and shown in FIG. 2, and therefore are not further described herein.

The dryer purge gas inlets 838, the dryer purge gas outlets 844, along with the openings 824 in the dryer plates 820, facilitate a crossflow of a dryer purge gas through each of the dryer modules of the dryer section 800. The dryer purge gas enters a dryer module of the dryer section 800 through the dryer purge gas inlets 838 on opposing sides of the module. The dryer purge gas flows through the openings 824 in the dryer plates 820 toward the gap 826. Dryer purge gas within the gap exits the dryer section 800 through the dryer purge gas outlet 844.

Flow of dryer purge gas through the dryer section 800 removes the moisture that is generated by the evaporation of water from the biomass material within the dryer section 800. Removing moisture from the dryer section 800 inhibits saturation of moisture in the dryer section 800 that can reduce the rate of subsequent evaporation. A heated dryer purge gas may be delivered to the dryer section 800 to directly heat the biomass material within the dryer section 800 in addition to exhausting moisture.

The torrefaction section 900 and the cooling section 1000 of the torrefaction reactor 700 shown in FIG. 4 are similar to the torrefaction section 300 and the cooling section 400 described above with reference to FIG. 1 and therefore are not further described herein.

Although the flow of the torrefaction purge gas is described above as flowing into the dryer section 800 through the dryer purge gas inlets 838 and out through the dryer purge gas outlets 844, in an alternate embodiment, the flow of dryer purge gas may be reversed such that the dryer purge gas enters the dryer section 800 through the dryer purge gas outlets 844 and exits through the dryer purge gas inlets 838. In another alternative embodiment, the dryer purge gas outlets 844 may be omitted, and one of the dryer purge gas inlets 838 is utilized as an outlet, and the other is utilized as the inlet such that the dryer purge gas flows across the dryer section 802 from one side to an opposite side. In another embodiment, rather than flowing through holes 824 in the dryer plates 820, the holes 824 may be omitted and the dryer plates 820 may be oriented substantially perpendicular to the sides of the dryer housing 802 from which the pair of dryer purge gas inlets 838 extend such that the dryer purge gas may flow from one side of the dryer housing 802 to an opposite side through the spaces between the dryer plates 820.

Figure 5:
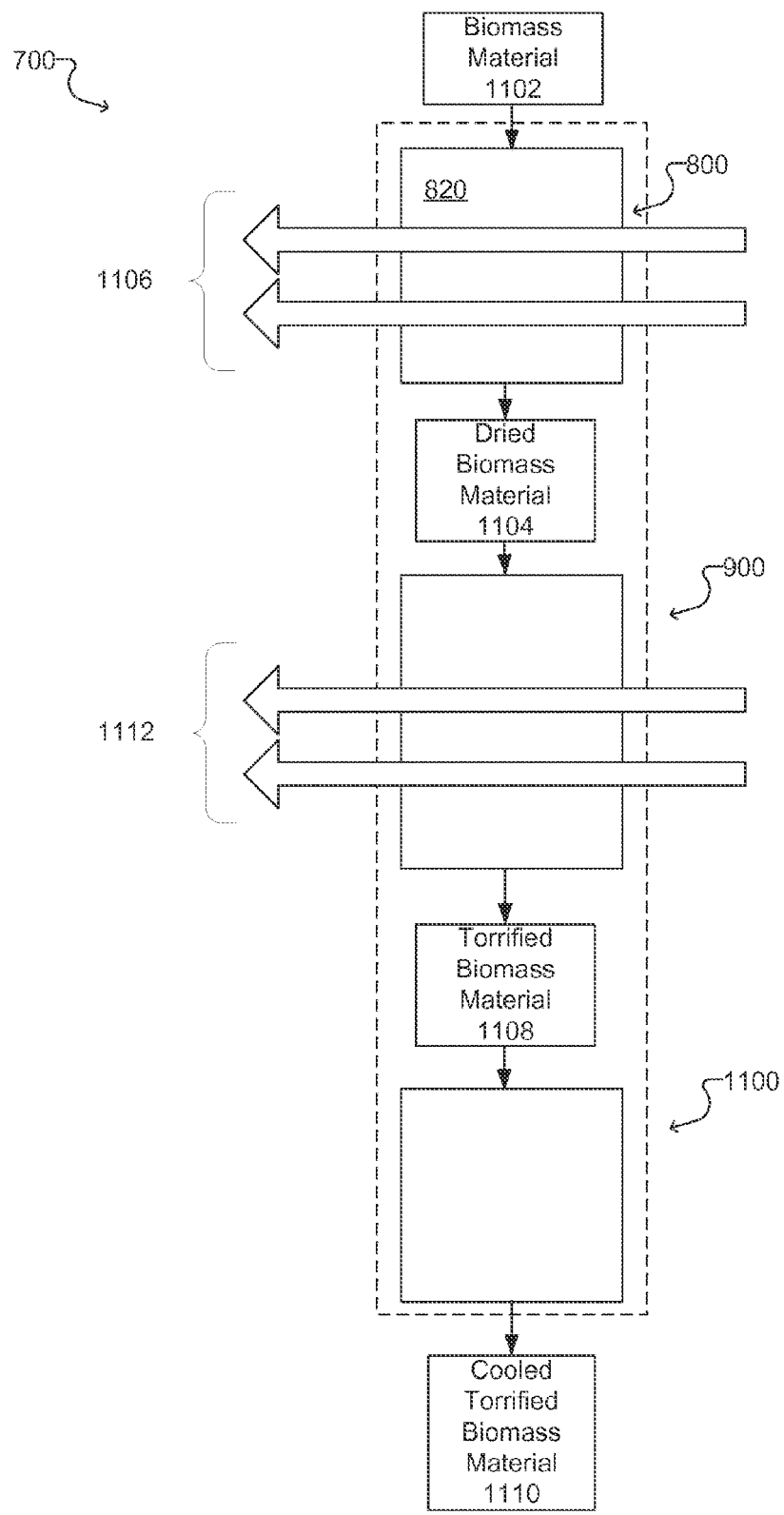
FIG. 5 is a schematic view of a torrefaction reactor according to an embodiment.

FIG. 5 shows a schematic diagram the torrefaction reactor 700 in operation. The biomass material 1102 is introduced into the torrefaction reactor 700 at the dryer section 800. Heated dryer fluid is delivered to the dryer plates 820 of the dryer section 800 via the dryer fluid inlet manifold 824 to indirectly heat and dry the biomass material 1102 in the dryer section 800.

The dryer fluid may be heated utilizing a combustion furnace prior to delivery to the dryer plates 820. The temperature difference between the dryer plates 820 and the biomass material 1102 affects the rate of heat transfer from the dryer plates 820 to the biomass material 1102.

A dryer purge gas 1106 flows through the dryer section 800 to remove moisture that is generated from water evaporating given off from the biomass material 1102 in the dryer section 800 during drying. The dryer purge gas 1106 may be heated to directly heat the biomass material 1102 in the dryer section 800.

For example, the torrefaction purge gas 1112 that exits the torrefaction section 900 may be delivered to the dryer section 800 to be utilized as dryer purge gas 1106 such that the heat from the torrefaction purge gas 1112 that exits the torrefaction section 900 is utilized to indirectly heat the biomass material 1102 in the dryer section 800.

The biomass material 1102 may be heated and dried in the dryer section 800 in several stages. For example, in a "pre-drying stage", the biomass material 1102 may be heated to almost 100° C. After the biomass material 1102 is heated to a temperature of about 100° C., water may be evaporated from the biomass material 1102 in a "drying stage". The drying stage utilizes a greater amount of energy than the pre-drying stage because of the heat lost by the biomass material 1102 due to evaporation of water. After the drying stage, the dried biomass material 1102 may be heated in a "heating stage" to a temperature of between 150° C. and about 200° C. prior to being delivered to the torrefaction section 900. The energy to heat the biomass material in the heating stage is less than the energy utilized in the drying stage because the amount of water that is evaporated from the biomass material 1102 during heating stage is small compared to the amount of water evaporated during the drying stage.

After exiting the dryer section 800, the dried biomass material 1104 enters the torrefaction section 900 to be torrified. The torrified biomass material 1108 that exits the torrefaction section 900 enters the optional cooling section 1000, before exiting the torrefaction reactor 700 as cooled torrified biomass material 1110. The process for torrefaction of the dried biomass material 1104, and cooling of the torrified biomass material 1106 is similar to the torrefaction and cooling processes described above with reference to FIG. 3 and therefore are not further described herein.

Similar to the torrefaction reactor 100, the dryer fluid, the torrefaction fluid, and the cooling fluid of the torrefaction reactor 700 may be delivered in separate closed loops, or may be delivered utilizing a single, closed loop.

Similarly, the torrefaction reactor 100, the dryer section 800, the torrefaction section 900, and the optional cooling section 1000 may include different numbers of plates than is shown in FIG. 4. The number of plates, and the spacing between adjacent heat transfer plates, may vary between the dryer section 800, the torrefaction section 900, and the cooling section 1000. The number of plates, and the spacing between adjacent plates, may vary between the banks of plates within any one of the dryer section 800, the torrefaction section 900, and the cooling section 1000 of torrefaction reactor 700.

For example, the various stages of the drying process within the dryer section 800, described above, may be associated with one or more dryer modules in the dryer section 800 such that as the biomass material flows through the dryer section 800, the biomass material moves through the different stages of the drying process. Because the energy utilized in each stage differs, the portions of the dryer section 800 associated with the stages of the drying process may differ in any or all of the number of banks, the number of plates within the banks, the separation distance between adjacent plates, and the temperature of the fluid delivered to the plates.

Similar to the torrefaction reactor 100 described above, the one or more of the dryer section 800, the torrefaction section 900, and the cooling section 1000 of the torrefaction reactor 700 shown in FIG. 4 may be arranged side-by-side. A conveyor belt or an Archimedes screw arrangement may be utilized to convey the biomass material between sections in the side-by-side arrangement.

In the above described embodiments, the preheater fluid, the torrefaction fluid, and the cooling fluid flow downwardly through the preheater plates 220, the torrefaction plates 320, and the cooling plates 420, co-current to the flow of biomass material through the preheater section 200, the torrefaction section 300, and the cooling section 400 of the torrefaction reactor 100. In an alternative embodiment in which any or all of the preheater fluid, the torrefaction fluid, and the cooling fluid may be a thermal oil, the thermal oil may flow upwardly, counter-current to the direction of biomass flow. Further, fluid through some banks of plates within any one of the preheater section 200, the torrefaction section 300, and the cooling section 400 may flow counter-current to the direction of biomass flow, while fluid through the other banks of that same section may flow co-current to the direction of biomass material flow. Similarly, in an alternative embodiment in which any or all of the dryer fluid, the torrefaction fluid, and the cooling of the torrefaction reactor 700 may be a thermal oil, the thermal oil may flow upwardly, counter-current to the direction of biomass material flow through the dryer section 800, the torrefaction section 900, and the cooling section 1000 of the torrefaction reactor 700.

Although the cooling section 400 of the torrefaction reactor 100 shown in FIG. 1 and the cooling section 1000 of the torrefaction reactor 700 shown in FIG. 4 do not include a purge gas flow, cooling sections 400, 1000 may include inlets and outlets similar to the torrefaction purge gas inlets 338 and torrefaction purge gas outlets 344 of the torrefaction section 300 described above to facilitate flowing a purge gas through the cooling sections 400, 1000. The cooling plates may also include openings, similar to the openings 324 of the torrefaction plates 320, to facilitate flowing a purge gas through the cooling sections of the torrefaction reactors 100, 700.

For example, purge gas flow through the cooling sections 400, 1000 may be utilized to directly cool to biomass material in the cooling sections 400, 1000 in addition to the indirect cooling. In the torrefaction reactor 700, the purge gas that has been heated by flowing through the cooling section 1000 may be delivered to the dryer section 800 as heated dryer purge gas to provide direct heating to the biomass material in the dryer section 800.

Although the valves of the torrefaction reactors 100, 700 shown in the examples of FIGS. 1 and 4 are rotary airlocks 214, 314, 414, 814 other suitable valves may be utilized to substantially seal the torrefaction sections 300, 900 and the cooling sections 400, 1000 as well as regulate flow of biomass material through the torrefaction reactors 100, 700. For example, devices utilizing an Archimedean screw may be utilized as the valves.

The torrefaction reactor of the present disclosure facilitates drying, torrefaction, and cooling the biomass material within a single apparatus without transporting biomass material between separate apparatuses.

Combustibles, including volatiles, dust, and tar, produced during torrefaction may be removed from the torrefaction reactor. Removing combustibles increases the safety of the torrefaction reactor by inhibiting the build-up and ignition of combustibles in the reactor. Removed combustibles may also be utilized to produce heat for subsequent torrefaction, increasing the energy efficiency of the torrefaction reactor and providing a torrefaction process that is partially self-sustaining.

The heat removed from the torrified biomass material during the cooling stage may be utilized for providing heat for subsequent torrefaction. The hot flue gas produced by combustion within a furnace may be utilized to directly heat the biomass material. By recycling the heat in the torrefaction process, the efficiency of the torrefaction reactor is increased.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. A torrefaction reactor for a particulate biomass material comprising:
   a preheater section comprising:
   a preheater housing; and
   a preheater bank including a plurality of preheater plates arranged within the preheater housing in a spaced relationship to facilitate the flow of the biomass material between the preheater plates by the force of gravity, each of the plurality of preheater plates including an inlet and an outlet to facilitate a flow of a preheater fluid through the preheater plates for heating the biomass material to a temperature less than a torrefaction temperature;
   a torrefaction section arranged to receive the biomass material from the preheater section comprising:
   a torrefaction housing;
   a torrefaction bank including a plurality of torrefaction plates arranged within the torrefaction housing in a spaced relationship to, after the biomass material is heated in the preheater housing, facilitate the flow of the biomass material between the torrefaction plates by the force of gravity, each of the plurality of torrefaction plates including an inlet and an outlet to facilitate a flow of a torrefaction fluid through the torrefaction plates for heating the biomass material to the torrefaction temperature, and including a plurality of torrefaction plate openings, each torrefaction plate opening having a substantially sealed periphery; and a first torrefaction purge gas opening on a first side of the torrefaction housing and a second torrefaction purge gas opening on a second side of the torrefaction housing, which second side is opposite to the first side, and a third torrefaction purge gas opening on a third side of the torrefaction housing, which third side is adjacent to the first and second sides, wherein the torrefaction plates are generally parallel with the first side and the second side of the torrefaction housing to facilitate a flow of a torrefaction purge gas through the torrefaction plate openings and across the torrefaction housing, the torrefaction purge gas for providing an oxygen-depleted environment within the torrefaction section.

2. The torrefaction reactor according to claim 1, wherein the preheater section and the torrefaction section are in a stacked arrangement to facilitate the flow of the biomass material from the preheater section to the torrefaction section by the force of gravity.

3. The torrefaction reactor according to claim 2, comprising a first valve that couples an outlet of the preheater section to an inlet of the torrefaction section and a second valve that couples to an outlet of the torrefaction section, wherein the first valve and the second valve facilitate a flow of the biomass material through the torrefaction section and facilitate substantially sealing the torrefaction section from the preheater section and the external environment.

4. The torrefaction reactor according to claim 3, wherein the first and second valves devices are rotary airlocks or Archimedes screws.

5. The torrefaction reactor according to claim 1, wherein the flow of the torrefaction purge gas is in a direction generally perpendicular to the flow of the biomass material in the torrefaction section.

6. The torrefaction reactor according to claim 1, wherein the torrefaction purge gas is heated prior entering the torrefaction section to heat the biomass material in the torrefaction section.

7. The torrefaction reactor according to claim 1, wherein the third torrefaction purge gas opening is a torrefaction purge gas outlet and the first and second torrefaction purge gas openings are inlets.

8. The torrefaction reactor according to claim 7, wherein the two innermost torrefaction plates of the torrefaction bank are spaced further apart than the spacing between other adjacent torrefaction plates of the torrefaction bank, providing a gap in the center portion of the torrefaction bank, and wherein the torrefaction bank includes a cover covering the gap to divert the biomass material flowing through the torrefaction section away from the gap.

9. The torrefaction reactor according to claim 1, wherein the torrefaction section includes a plurality of torrefaction banks, a plurality of first torrefaction purge gas openings, and a plurality of second torrefaction purge gas openings, wherein at least one first torrefaction purge gas opening and at least one second torrefaction purge gas opening are located on the torrefaction housing, adjacent to each torrefaction bank.

10. The torrefaction reactor according to claim 9, wherein each torrefaction bank is associated with a respective one of a plurality of torrefaction stages.

11. The torrefaction reactor according to claim 10, wherein the plurality of torrefaction stages include a pre-torrefaction stage, a holding stage, and a cooling stage.

12. The torrefaction reactor according to claim 1, wherein the torrefaction fluid from the outlets of the plurality of torrefaction plates is delivered to the inlets of the plurality of preheater plates as preheater fluid for the preheater section.

13. The torrefaction reactor according to claim 1, wherein the torrefaction fluid is a thermal oil that flows through the plurality of torrefaction plates in a direction counter-current to the flow of biomass material through the torrefaction section.

14. The torrefaction reactor according to claim 1, wherein the preheater housing includes a first dryer purge gas opening on a first side of the preheater housing and a second dryer purge gas opening on a second side of the preheater housing to facilitate a flow of a dryer purge gas across the preheater housing, the dryer purge gas for removing moisture from the preheater section when the preheater section is utilized for drying the biomass material.

15. The torrefaction reactor according to claim 14, wherein the flow of the dryer purge gas is in a direction generally perpendicular to the flow of the biomass material in the preheater section.

16. The torrefaction reactor according to claim 14, wherein the preheater section includes a plurality of preheater banks, wherein each preheater bank is associated with a respective one of a plurality of dryer stages.

17. The torrefaction reactor according to claim 16, wherein the plurality of dryer stages include a pre-drying stage, a drying stage, and a heating stage.

18. The torrefaction reactor according to claim 14, wherein the first dryer purge gas opening is a dryer purge gas inlet and the second dryer purge gas opening is a dryer purge gas outlet.

19. The torrefaction reactor according to claim 14, wherein the dryer purge gas is heated for heating the biomass material in the preheater section to a temperature less than a torrefaction temperature as the dryer purge gas flows through the preheater section.

20. The torrefaction reactor according to claim 14, wherein each of the preheater plates includes a plurality of preheater plate openings, each preheater plate opening having a sealed periphery.

21. The torrefaction reactor according to claim 20, wherein the first and the second sides of the preheater housing are oriented generally parallel to the preheater plates to facilitate the flow of the dryer purge gas through the dryer plate openings.

22. The torrefaction reactor according to claim 21, wherein the second side of the preheater housing having the second dryer purge gas opening is opposite the first side of the preheater housing having the first dryer purge gas opening.

23. The torrefaction reactor according to claim 22, wherein the two innermost preheater plates of the preheater bank are spaced further apart than the spacing between other adjacent preheater plates of the preheater bank, providing a gap in the center portion of the preheater bank, and wherein the preheater bank includes a cover covering the gap to divert the biomass material flowing through the preheater section away from the gap, and wherein preheater section includes a third dryer purge gas opening on a third side of the preheater housing adjacent to the first side and the second side of the preheater housing, wherein the third dryer purge gas opening is a dryer purge gas outlet and the first and second dryer purge gas openings are inlets.

24. The torrefaction reactor according to claim 1, comprising a cooling section arranged to receive the biomass material from the torrefaction section comprising:
   a cooling housing;
   a cooling bank comprising a plurality of cooling plates arranged within the cooling housing in a spaced relationship to, after the biomass material is heated in the torrefaction section, facilitate flow of the material between the cooling plates by the force of gravity, each of the plurality of cooling plates including an inlet and an outlet to facilitate a flow of a cooling fluid through the cooling plates for cooling the biomass material to less than about 200° C.

25. The torrefaction reactor according to claim 24, wherein the cooling housing includes a first cooling purge gas opening on a first side of the cooling housing and a second cooling purge gas opening on a second side of the cooling housing to facilitate a flow of a cooling purge gas through the cooling section, the cooling purge gas for cooling the biomass material in the cooling section.

26. The torrefaction reactor according to claim 25, wherein the flow of the cooling purge gas is in a direction generally perpendicular to the flow of the biomass material in the cooling section.

27. The torrefaction reactor according to claim 25, wherein the first cooling purge gas opening is a cooling purge gas inlet and the second cooling purge gas opening is a cooling purge gas outlet.

28. The torrefaction reactor according to claim 25, wherein the cooling purge gas that has been heated by the biomass material in the cooling section is delivered to the torrefaction section as a heated torrefaction purge gas for heating the biomass material in the torrefaction section.

29. The torrefaction reactor according to claim 25, wherein each of the cooling plates includes a plurality of cooling plate openings, each cooling plate opening having a sealed periphery.

30. The torrefaction reactor according to claim 29, wherein the first and second sides of the cooling housing are oriented generally parallel to the cooling plates to facilitate the flow of the cooling purge gas through the cooling plate openings in the plurality of cooling plates.

31. The torrefaction reactor according to claim 30, wherein the second side of the cooling housing having the second cooling purge gas opening is opposite the first side of the cooling housing having the first cooling purge gas opening.

32. The torrefaction reactor according to claim 31, wherein the two innermost cooling plates of the cooling bank are spaced further apart than the spacing between other adjacent cooling plates of the cooling bank, providing a gap in the center portion of the cooling bank, and wherein the cooling bank includes a cover covering the gap to divert the biomass material flowing through the cooling away from the gap, and wherein cooling section includes a third cooling purge gas opening vent, located on a third side of the cooling housing adjacent to the first side and the second side of the cooling housing, wherein the third cooling purge gas opening is a cooling purge gas outlet and the first and second cooling purge openings are cooling purge gas inlets.

33. The torrefaction reactor according to claim 24, wherein the preheater section, the torrefaction section, and the cooling section are in a stacked arrangement to facilitate the flow of the biomass material from the preheater section to the torrefaction section, and from the torrefaction section to the cooling section, by the force of gravity.

34. The torrefaction reactor according to claim 33, comprising a first valve that couples an outlet of the preheater section to an inlet of the torrefaction section and a second valve that couples an outlet of the torrefaction section and an inlet of the cooling section, wherein the first valve and the second valve substantially seal the torrefaction housing from the preheater section and the cooling section while facilitating a flow of the biomass material through the torrefaction section.

35. The torrefaction reactor according to claim 34, wherein the first and second valves are rotary airlocks or Archimedes screws.

36. The torrefaction reactor according to claim 24, wherein the torrefaction fluid from the outlets of the plurality of torrefaction plates is delivered to the inlets of the plurality of preheater plates as the preheater fluid, and the preheater fluid from the outlets of the plurality of preheater plates is delivered to the inlets of the plurality of cooling plates as cooling fluid.

* * * * *